(12) United States Patent
Polehn et al.

(10) Patent No.: US 11,258,691 B2
(45) Date of Patent: Feb. 22, 2022

(54) SYSTEMS AND METHODS FOR TRACKING AND CALCULATING GRANULAR NETWORK PERFORMANCE METRICS BASED ON USER TRAFFIC

(71) Applicant: Verizon Patent and Licensing Inc., Basking Ridge, NJ (US)

(72) Inventors: Donna L. Polehn, Mercer Island, WA (US); Arda Aksu, Martinez, CA (US); Vishwanath Ramamurthi, San Ramon, CA (US); Lalit R. Kotecha, San Ramon, CA (US); David Chiang, Fremont, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/924,780

(22) Filed: Jul. 9, 2020

(65) Prior Publication Data
US 2022/0014455 A1    Jan. 13, 2022

(51) Int. Cl.
*H04L 12/26* (2006.01)
*H04L 43/10* (2022.01)
*H04L 69/22* (2022.01)

(52) U.S. Cl.
CPC .............. *H04L 43/10* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2007/0271219 A1* | 11/2007 | Agarwal | G06F 11/008 |
| 2018/0034712 A1* | 2/2018 | Nainar | H04L 41/5009 |
| 2020/0174784 A1* | 6/2020 | Bathen | G06N 20/00 |
| 2020/0229042 A1* | 7/2020 | Srivastava | H04W 36/385 |

* cited by examiner

*Primary Examiner* — James A Edwards

(57) ABSTRACT

A system described herein may provide for the tracking and/or calculating of performance metrics associated with a network by marking traffic and determining performance characteristics of the marked traffic. Such performance characteristics or metrics may include throughput, latency, jitter, and/or other metrics. The marking may be performed on "user" traffic, which may be traffic that is generated or sent via the network by an application or service (e.g., a voice call service, a content streaming service, etc.), as opposed to "synthetic" or "test" traffic, which is traffic that is generated or sent for the purposes of testing performance of the network (e.g., traffic related to a "speed test" or the like).

20 Claims, 11 Drawing Sheets

402

| Mark value | SLA | From | To | Time out | Time in |
|---|---|---|---|---|---|
| a123456 | Under 10ms | <103-1> | <105-2> | xx60213 | xx60220 |
| b789012 | Under 30ms | <103-1> | <105-2> | xx60217 | xx60246 |
| b098765 | Under 30ms | <103-2> | <105-1> | xx60219 | xx60252 |
| a123123 | Under 10ms | <103-1> | <105-2> | xx60223 | xx60233 |

| Mark value | UE ID |
|---|---|
| a123456 | UE_A |
| b789012 | UE_B |
| b098765 | UE_C |
| a123123 | UE_A |

| SLA | UL delay | DL delay | RT delay | Jitter | Packet loss |
|---|---|---|---|---|---|
| Under 10ms | 9ms | 9ms | 18ms | 2ms | 0.013% |
| Under 30ms | 31ms | 28ms | 59ms | 14ms | 0.002% |

| QCI | UE ID | UL delay | DL delay | RT delay | Jitter | Packet loss |
|---|---|---|---|---|---|---|
| 1 | UE_A | 95ms | 92ms | 182ms | 5ms | 0.011% |
| 3 | UE_A | 42ms | 49ms | 88ms | 2ms | 0.001% |
| 1 | UE_B | 50ms | 50ms | 100ms | 3ms | 0.009% |

| QCI | SLA |
|---|---|
| 1 | Under 30ms |
| 3 | Under 10ms |

| QCI/SLA | UE ID | UL delay | DL delay | RT delay | Jitter | Packet loss |
|---|---|---|---|---|---|---|
| QCI 3/Under 10ms | UE_A | 51ms | 50ms | 101ms | 2ms | 0.014% |
| QCI 1/Under 30ms | UE_A | 126ms | 120ms | 246ms | 10ms | 0.013% |
| QCI 1/Under 30ms | UE_B | 81ms | 78ms | 159ms | 10ms | 0.011% |

FIG. 5C

SYSTEMS AND METHODS FOR TRACKING AND CALCULATING GRANULAR NETWORK PERFORMANCE METRICS BASED ON USER TRAFFIC

BACKGROUND

Networks may make use of Service Level Agreements ("SLAs") to provide a given level of performance (e.g., throughput, latency, jitter, and/or other metrics) for network traffic. Various techniques may be used to determine whether particular SLAs are met, such as sending artificial "test" packets through the network.

BRIEF DESCRIPTION OF THE DRAWINGS

FIGS. 4A-4C illustrate example data structures that may be used to determine aggregated performance metrics of traffic sent between network components in accordance with some embodiments;

FIGS. 5A-5C illustrate example data structures that may be used to determine aggregated performance metrics, including RAN metrics, of traffic sent between network components in accordance with some embodiments;

DETAILED DESCRIPTION OF THE PREFERRED EMBODIMENTS

The following detailed description refers to the accompanying drawings. The same reference numbers in different drawings may identify the same or similar elements.

Embodiments described herein provide for the tracking and/or calculating of performance metrics associated with a network by marking traffic and determining performance characteristics of the marked traffic. Such performance characteristics or metrics may include throughput, latency, jitter, and/or other suitable metrics. The marking may be performed on "user" traffic, which may be traffic that is generated or sent via the network by an application or service (e.g., a voice call service, a content streaming service, etc.), as opposed to "synthetic" or "test" traffic, which is traffic that is generated or sent for the purposes of testing performance of the network (e.g., traffic related to a "speed test" or the like).

For example, some networks or network devices may provide different levels of performance to synthetic traffic than to user traffic, in order to artificially boost performance metrics associated with such networks or devices. For example, such networks or network devices may examine header information or other attributes of synthetic traffic to identify that the traffic is synthetic test traffic, and may accordingly modify queue weights or other treatment of the traffic in order to cause the traffic to exhibit higher performance values. On the other hand, no such preferential treatment may be given to user traffic, which may result in user traffic exhibiting different performance values than synthetic test traffic. Thus, while synthetic test traffic may meet one or more SLAs (e.g., minimum latency or throughput values), user traffic may not meet such SLAs. As such, evaluating actual user traffic may provide a more accurate view of the actual performance of a given network, portion of the network, network devices, etc. Further, evaluating actual user traffic may conserve network resources that would be otherwise consumed by sending synthetic test packets. While discussed here in the context of user traffic, similar concepts may apply to other types of traffic that is sent within a network, such as control plane traffic, Precision Time Protocol ("PTP") traffic, and/or other traffic.

Figure 1:
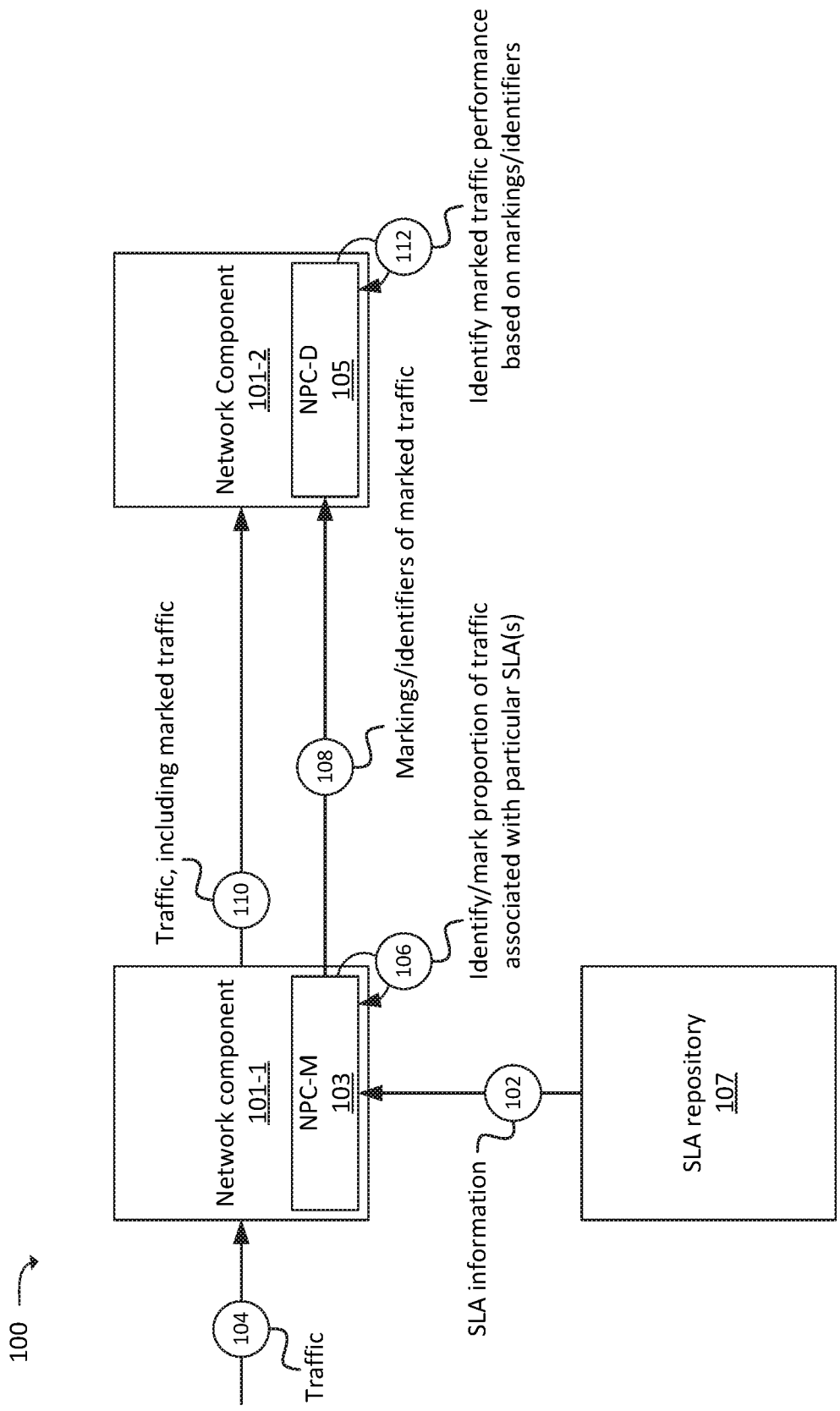
FIG. 1 illustrates an example of marking user plane traffic and identifying performance metrics of the user plane traffic based on the marked user plane traffic, in accordance with some embodiments.

As shown in FIG. 1, a set of network components 101-1 and 101-2 (sometimes referred to individually as "network component 101" or in plural as "network components 101") may be deployed within network 100. For example, network components may be, may include, or may be implemented by computing devices, Virtualized Network Functions ("VNFs"), MECs, routers, hubs, switches, and/or other types of network devices. Network components 101 may be associated with network interfaces (e.g., hardware interfaces) via which network components 101 may be communicatively coupled to each other and/or to one or more other devices and/or networks. Accordingly, network components 101 may communicate traffic to and/or from each other, such as user traffic received from and/or destined for a User Equipment ("UE"), such as a mobile telephone, laptop computer, tablet computer, or the like.

Network devices 101 may be associated with one or more SLAs for certain types of traffic (e.g., traffic associated with a particular application or class of applications, such as voice call applications or content streaming applications), certain Quality of Service ("QoS") indicators (e.g., QoS Class Identifier ("QCI") values), certain users (e.g., where different users may be associated with different levels of service, such as enterprise users, emergency or first responder users, or the like), certain network slices (e.g., where a network may be implemented by multiple instances or "slices"), different geographic locations (e.g., as indicated as Tracking Area Identity ("TAI")), and/or other differentiating attributes of traffic. In one example, different entities may manage, own, operate, etc. network component 101-1, network component 101-2, and/or a hardware interface (e.g., fiber cable or other type of interface) via which network component 101-1 and network component 101-2 may communicate. In such situations, network component 101-1 and/or network component 101-2 may each be associated with one or more SLAs.

Embodiments described herein may calculate and determine the performance of traffic handled by network components 101 by marking user traffic and identifying the performance of marked traffic. For example, in some embodiments, network component 101-1 may be associated with Network Performance Component ("NPC") Marker ("NPC-M") 103, and network component 101-2 may be associated with NPC Determiner ("NPC-D") 105.

For example, NPC-M 103 may be implemented by the same device or system as network component 101-1, and NPC-D 105 may be implemented by the same device or system as network component 101-2. In some embodiments, for instance, network component 101-1 and NPC-M 103 may share the same set of network interfaces, and/or NPC-M 103 may receive some or all user traffic egressed from network component 101-1. In some embodiments, NPC-M 103 may include a packet analyzer or packet capture functionality, and/or traffic outputted by network component 101-1 may otherwise traverse NPC-M 103 before being sent to network component 101-2. In some embodiments, NPC-M 103 may be, and/or may be implemented by, an application installed at network component 101-1. In some embodiments, NPC-M 103 may be pre-loaded or pre-provisioned when network component 101-1 is instantiated (e.g., in situations where network component 101-1 includes or is implemented by a virtual machine or other set of configurable resources).

Similarly, network component 101-2 and NPC-D 105 may share the same set of network interfaces, and/or NPC-D 105 may receive some or all ingress user traffic destined for, or handled by, network component 101-2. In some embodiments, NPC-D 105 may include a packet analyzer or packet capture functionality, and/or traffic outputted to network component 101-2 may otherwise traverse NPC-D 105 before being provided to network component 101-2 (e.g., to other components of network component 101-2). In some embodiments, NPC-D 105 may be, and/or may be implemented by, an application installed at network component 101-2. In some embodiments, NPC-D 105 may be pre-loaded or pre-provisioned when network component 101-2 is instantiated (e.g., in situations where network component 101-2 includes or is implemented by a virtual machine or other set of configurable resources).

In accordance with some embodiments, as shown in FIG. 1, NPC-M 103 may receive (at 102) SLA information from SLA repository 107. SLA repository 107 may maintain information regarding SLAs (e.g., thresholds of performance metrics) that are to be provided by network component 101-1. For instance, SLA repository 107 may be, may include, and/or may be implemented by a Unified Data Management function ("UDM") of a wireless network, a Home Subscriber Server ("HSS"), a Policy Charging and Rules Function ("PCRF"), a Policy Control Function ("PCF"), and/or some other suitable device or system. As noted above, the SLAs may include different performance metrics for different traffic applications, users, network slices, etc.

As further shown, network component 101-1 may receive (at 104) traffic to be sent to (or toward) network component 101-2. NPC-M 103 may identify (at 106) a proportion (e.g., 1%, 10%, 75%, or some other proportion) of traffic associated with varying SLAs, such that this proportion can be marked in accordance with some embodiments. For example, if the SLA information (received at 102) indicates three different SLAs (e.g., first, second, and third maximum latency values) for three different application types, NPC-M 103 may mark the particular proportion (e.g., 1%) of traffic for the first application type, 1% of traffic for the second application type, and 1% of traffic for the third application type. In some embodiments, NPC-M 103 may mark different proportions for different SLAs, traffic types, etc. For example, as discussed below, network component 101 or some other device or system may determine that performance metrics associated with a particular SLA do not meet thresholds associated with the particular SLA, and that traffic associated with the particular SLA should accordingly be marked at a greater proportion than traffic associated with other SLAs.

In some embodiments, marking (at 106) the traffic may include generating a unique value (and/or selecting a value from a pool). For example, NPC-M 103 may generate a random or pseudorandom value, and/or may otherwise generate or determine a unique value (referred to herein as a "mark value"). NPC-M 103 may mark the identified traffic by placing the mark value in the traffic, such as by placing the mark value in header information associated with packets of which the identified traffic is comprised.

In some embodiments, the mark value may include, and/or may otherwise be based on, a timestamp or other indicator of a time at which the traffic was received by NPC-M 103 (e.g., output from network component 101-1). For example, in some embodiments, the mark value may be, or may include, a value generated by performing a cryptographic hash of a timestamp that corresponds to a time at which NPC-M 103 received the traffic. As discussed below, this encrypted value may be decrypted (e.g., by NPC-D 105) in order to determine the timestamp. For example, NPC-M 103 and NPC-D 105 may utilize a shared key cryptography technique, an asymmetric key pair cryptography technique, and/or some other suitable technique to securely communicate the timestamp via the mark values. In this manner, even if network component 101-1 and/or some other device or system were to identify the mark values within the traffic (e.g., by inspecting headers, performing deep packet inspection ("DPI"), etc.), such mark values would be unlikely or impossible to detect as being associated with the tracking or calculating of performance metrics.

In some embodiments, NPC-M 103 may mark the traffic by placing the mark value in a "shim" header, a Multi-Protocol Label Switching ("MPLS") label, an Internet Protocol ("IP") header (e.g., an IPv4 header or an IPv6 header), an "options" field of a header (e.g., an "options" field of an IP header), placing the mark value within traffic payloads, and/or otherwise including the mark value in the traffic. In some embodiments, NPC-M 103 may maintain correlation information, correlating particular mark values with particular timestamps. For example, in embodiments where the mark values do not include timestamps (or values derived from timestamps), such correlation information may be used to indicate times at which traffic, with particular mark values that correspond to particular timestamps, was sent by network component 101-1.

In some embodiments, as discussed below, NPC-M 103 may provide the timestamp (or value derived from the timestamp, such as a hashed and/or encrypted value, as discussed above) directly to NPC-D 105 by including the timestamp in the mark, appending the timestamp to the mark, etc. (e.g., in header information of marked traffic). In some embodiments, NPC-M 103 may provide the timestamp to another device or system, along with correlation information. For example, NPC-M 103 may provide the timestamp and the mark value to the other device or system. As discussed below, this other device or system may provide the correlation information to NPC-D 105, and/or may receive timestamp information from NPC-D 105, based on which NPC-D 105 and/or the other device or system may determine a difference between the timestamps applied by NPC-M 103 and NPC-D 105. This difference may indicate an amount of time that traffic took to reach network component 101-2 once output by network component 101-1, which may be referred to as "one-way delay," "one-way latency," or the like.

As further shown in FIG. 1, NPC-M 103 may provide (at 108) mark values associated with the marked traffic to NPC-D 105. For example, NPC-M 103 and NPC-D 105 may communicate via an application programming interface ("API") or some other suitable communication pathway. Additionally, or alternatively, NPC-M 103 may provide (at 108) the mark values to another device or system which may, in turn, provide the mark values to NPC-D 105. As discussed above, NPC-M 103 may, in some embodiments, provide (at 108) timestamp information associated with marked traffic to NPC-D 105 and/or to another device or system.

Network component 101-1 may further output (at 110) traffic to network component 101-2. As noted above, the traffic may include user traffic associated with one or more services or applications provided by network component 101-1 and/or network component 101-2, as opposed to synthetic test traffic. NPC-D 105 may identify which of the traffic (received at 110) is marked traffic. For example, NPC-D 105 may identify header information of the received traffic to identify which of the received traffic includes mark values (provided at 108). NPC-D 105 may further identify a time at which the marked traffic was received. As discussed above, NPC-D 105 may determine a difference, for some or all of the marked traffic, between the time that the traffic was output from network component 101-1 and the time that the traffic was received by network component 101-2 (e.g., the one-way delay of the traffic).

In some embodiments, as discussed below, one or more other devices or systems may determine the one-way delay of the traffic, based on timestamps generated and/or provided by NPC-M 103 and/or NPC-D 105. As further discussed below, by aggregating one-way delay performance metrics for multiple packets that are associated with multiple SLAs, other performance metrics (e.g., round-trip delay, jitter, or other metrics) may be able to be determined on a per-SLA basis.

Figure 2:
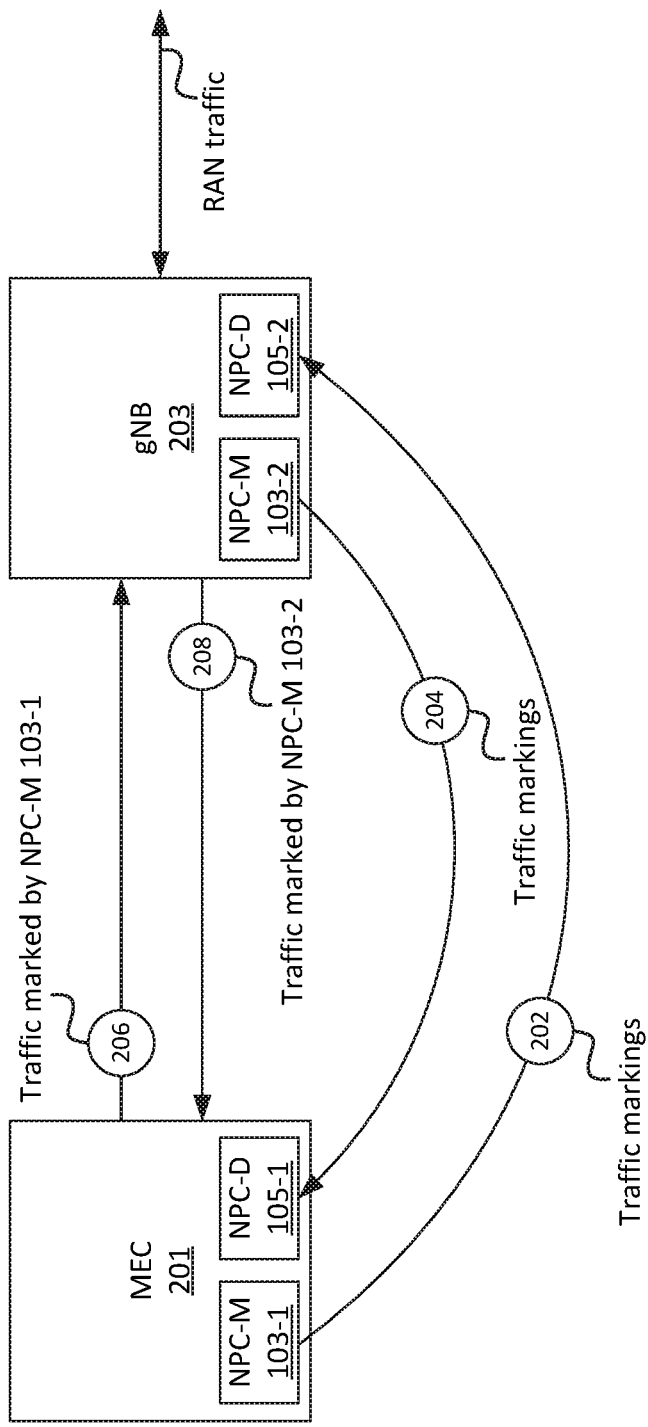
FIG. 2 illustrates an example of determining performance metrics of traffic sent to and/or from a Multi-Access/Mobile Edge Computing ("MEC") device (referred to sometimes herein simply as ("MEC")) based on marked user plane traffic, in accordance with some embodiments.

For example, in order to determine round-trip delay, some embodiments may include the deployment of multiple instances of NPC-M 103 and NPC-D 105. For example, as shown in FIG. 2, a first instance of NPC-M 103 (i.e., NPC-M 103-1) and a first instance of NPC-D 105 (e.g., NPC-D 105-1) may be associated with (e.g., installed, provisioned, and/or otherwise associated with) a first network component (e.g., MEC 201), and NPC-M 103-2 and NPC-D 105-2 may be associated with a second network component (e.g., Next Generation Node B ("gNB") 203).

As discussed below, gNB 203 may send and/or receive traffic via an air interface to one or more UEs, such as a wireless telephone. Further, gNB 203 may be communicatively coupled to MEC 201, and may send and/or receive traffic, associated with one or more UEs connected to gNB 203, to and/or from MEC 201. MEC 201 may, for example, perform processing, calculations, computations, etc. on traffic received from one or more UEs (e.g., via gNB 203), and may provide processed traffic to such UEs (e.g., via gNB 203). Additionally, or alternatively, MEC 201 may generate traffic and/or receive traffic from some other source, and may provide such traffic to UEs via gNB 203.

In some embodiments, MEC 201 may be associated with one or more SLAs, such as threshold one-way delay times (e.g., for traffic sent from MEC 201 to gNB 203). While not shown here, NPC-M 103-1 and/or NPC-M 103-2 may receive SLA information (e.g., from SLA repository 107 and/or some other device or system), based on which NPC-M 103-1 and/or NPC-M 103-2 may identify packets to mark in a manner similar to that described above (e.g., a proportion of traffic associated with one or more particular SLAs).

As shown, NPC-M 103-1 may provide (at 202) mark values to NPC-D 105-2, and NPC-M 103-2 may provide (at 204) mark values to NPC-D 105-1. In some embodiments, NPC-M 103-1 and/or NPC-M 103-2 may provide (at 202 and 204) the mark values in addition to timestamps and/or values derived from timestamps. Additionally, or alternatively, as discussed above, NPC-M 103-1 and/or NPC-M 103-2 may provide the mark values, timestamps, etc. to one or more other devices or systems. MEC 201 may thus output (at 206) traffic marked by NPC-M 103-1 to gNB 203, and gNB 203 may output (at 208) traffic marked by NPC-M 103-2 to MEC 201. As similarly discussed above, NPC-D 105-1 may determine performance metrics (e.g., one-way delay) of marked traffic received from gNB 203, and NPC-D 105-2 may determine performance metrics of marked traffic received from MEC 201.

Figure 3:
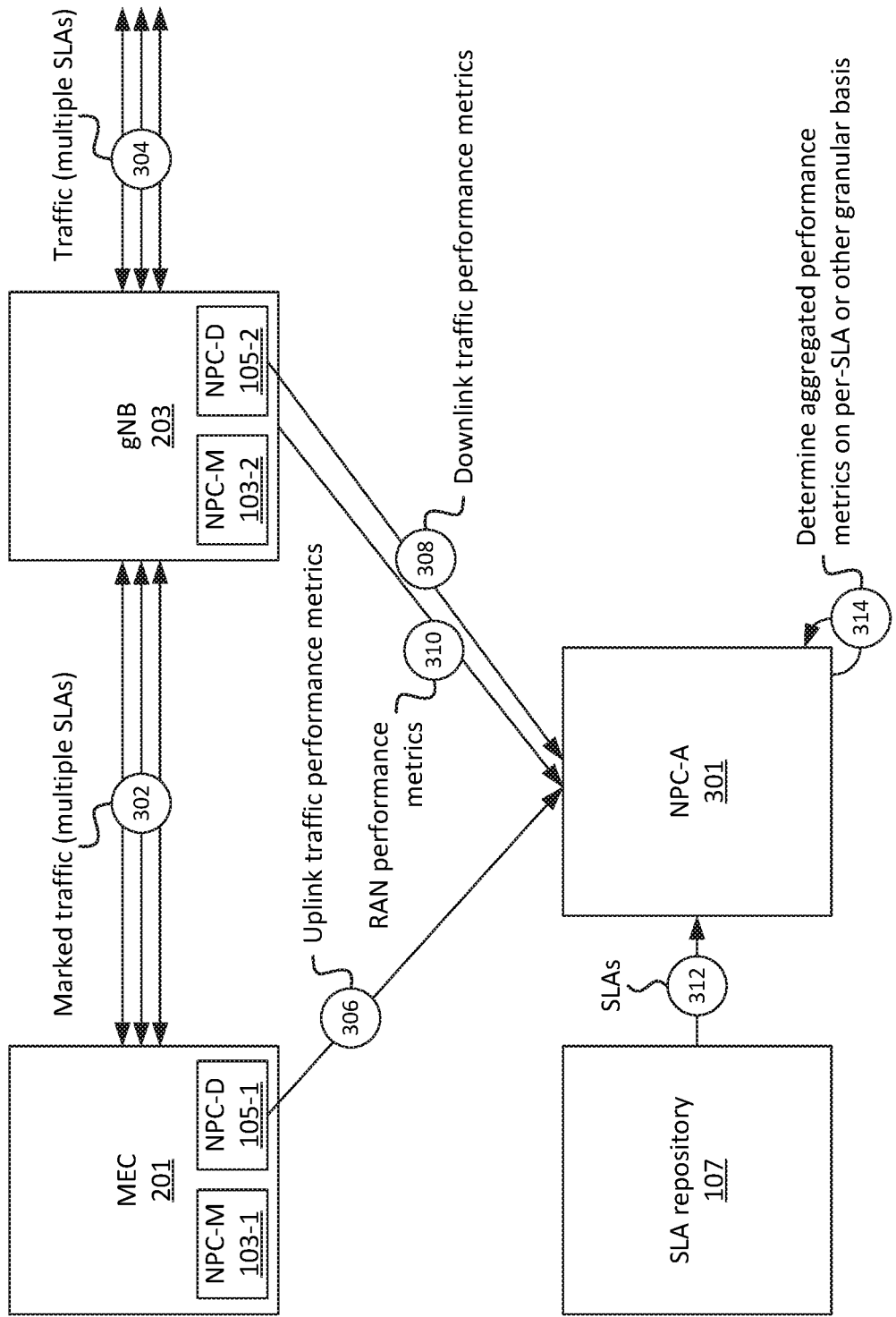
FIG. 3 illustrates an example of determining aggregated performance metrics, on a per-SLA basis, of traffic sent to and/or received from a MEC and/or a radio access network ("RAN") of a wireless network, in accordance with some embodiments.

Additionally, or alternatively, as shown in FIG. 3, NPC-D 105-1 and/or NPC-D 105-2 may communicate with NPC Aggregator ("NPC-A") 301 in order to facilitate the determination of aggregated performance metrics, such as jitter, round-trip delay, and/or other metrics. For example, as shown, MEC 201 and gNB 203 may send and/or receive (at 302) traffic, including marked traffic. The communication pathway between MEC 201 and gNB 203 may be referred to as a "haul" of traffic (e.g., a transport of traffic within the network), such as a "mid-haul" or "x-haul" of the traffic. The traffic (e.g., the marked traffic) may be traffic associated with one or more SLAs, as discussed above. Further, gNB 203 may wirelessly send and/or receive (at 304) traffic to and/or from one or more UEs. This traffic may also be associated with one or more SLAs, which may be the same SLAs associated with the traffic sent (at 302) between MEC 201 and gNB 203, may be different SLAs that correspond to the SLAs associated with the traffic sent between MEC 201 and gNB 203, and/or may be associated with different SLAs that are independent of SLAs associated with the traffic sent between MEC 201 and gNB 203.

As further shown, NPC-D 105-1 may provide (at 306) uplink performance metrics to NPC-A 301. For example, NPC-D 105-1 may determine one-way delay of packets sent from gNB 203 (e.g., as marked by NPC-M 103-2) to MEC 201 in a manner similar to that described above. Additionally, or alternatively, NPC-D 105-1 may provide timestamps and mark values of marked traffic to NPC-A 301, based on which NPC-A 301 may determine the uplink performance metrics (e.g., further based on timestamps and mark values provided by NPC-M 103-2). Similarly, NPC-D 105-2 may provide (at 308) downlink performance metrics to NPC-A 301, such as one-way delay of packets sent from MEC 201 (e.g., as marked by NPC-M 103-1) to gNB 203.

In some embodiments, gNB 203 may further provide (at 310) RAN performance metrics, which may be based on performance of traffic sent to and/or received from one or more UEs by gNB 203. Such RAN performance metrics may include one-way delay, round-trip delay, jitter, and/or other suitable performance metrics. In some embodiments, gNB 203 may determine or receive such metrics on a per-SLA basis, a per-UE basis, a per-application basis, and/or on some other basis.

NPC-A 301 may further receive (at 312) SLA information from SLA repository 107. The SLA information may indicate one or more SLAs associated with MEC 201 and/or gNB 203 (e.g., threshold values for uplink one-way delay, downlink one-way delay, round-trip delay, jitter, packet loss, and/or other performance metrics). In some embodiments, the SLA information (received at 312) may include mapping or correlation information that correlates SLAs of traffic sent (at 302) between MEC 201 and gNB 203 to SLAs of traffic sent (at 304) between gNB 203 and one or more UEs. For example, gNB 203 may output traffic to a given UE according to an SLA that includes or relates to a particular QCI value, while MEC 201 may output traffic to gNB 203 (e.g., traffic destined for the given UE) according to an SLA that uses some other type of QoS indicator or type of SLA. For example, the SLA for traffic sent to gNB 203 by MEC 201 (e.g., for the particular UE) may be expressed in terms of a threshold one-way delay, may specify a threshold proportion of traffic that meets the threshold (e.g., at least 90% of traffic from MEC 201 to gNB 203 meets the threshold one-way delay), and/or may be specified in some other manner.

Based on the information provided (at 306-312) by NPC-D 105-1, NPC-D 105-2, gNB 203, and/or SLA repository 107, NPC-A 301 may determine (at 314) aggregated performance metrics on a per-SLA or some other granular basis. FIGS. 4A-4C illustrate example data structures that may reflect the determination of aggregated performance metrics by NPC-A 301. As shown in FIG. 4A for example, data structure 402 may include information that may be used (e.g., by NPC-A 301) to determine one-way delay performance metrics, on a per-SLA basis, per-UE basis, and/or some other basis. For example, data structure 402 may include mark values associated with traffic marked by NPC-M 103, SLAs associated with marked traffic, an identifier of a particular NPC-M 103 that marked the traffic, an identifier of a particular NPC-D 105 that received the traffic, a time at which the traffic was marked and/or output ("Time out"), and a time at which the traffic was received ("Time in").

In some embodiments, each row of data structure 402 may be associated with a particular marked packet. In some embodiments, different arrangements are possibly for data structure 402. As shown, for example, a particular packet may have a mark value of "a123456." As noted above, the mark value may be generated by a particular NPC-D 105 that performs the marking of the packet. In some embodiments, as also discussed above, the mark value may encode a timestamp (e.g., a time at which the packet was marked) and/or some other value. In this example, the mark value may begin with the letter "a," which may be an indicator of a particular SLA associated with the packet. For example, the particular SLA associated with this packet may be an SLA that is associated with a 10 millisecond ("ms") one-way delay of traffic from NPC-M 103-1 to NPC-D 105-2 (where this SLA is denoted in the figure as "Under 10 ms"). On the other hand, as also illustrated in the figure, the prefix "b" (e.g., as denoted by the mark value "b789012") may indicate an SLA of "Under 30 ms."

Additionally, or alternatively, NPC-A 301 may determine the SLA associated with a packet based on an identifier of a particular NPC-M 103 or network component 101 from which the packet is received, and/or an identifier of a particular NPC-D 105 or network component 101 to which the packet is destined. In some embodiments, such identifiers may include IP addresses or other identifiers that may be present in the packet (e.g., in header information of the packet). For example, SLA information (received from SLA repository 107) may indicate SLAs associated with particular UEs and/or network components 101.

In some embodiments, the SLA represented in data structure 402 may be, or may correspond to, some other type of SLA. For example, the SLA represented in data structure 402 may, in some embodiments, be associated with a particular QCI, a particular network slice, a particular TAI, and/or some other differentiating characteristic associated with SLAs.

The timestamps (e.g., "Time out" and "Time in") may be expressed in terms of milliseconds after a reference time (sometimes referred to as an "epoch"). In this figure, the last five digits of such timestamps are presented, and the preceding "xx" on each of these timestamps refers to one or more preceding digits of the timestamps. In some embodiments, other representations of time are possible. The timestamps may be received from respective instances of NPC-M 103 and/or NPC-D 105, which may send and/or receive packets having the respective mark values. As noted above, in some embodiments, the timestamps may be encoded into the mark values, may be included in header information, and/or may be provided by NPC-M 103 and/or NPC-D 105 to NPC-A 301 via an API or other communication pathway.

As shown in FIG. 4B, data structure 404 may indicate a correlation between particular packets and particular UEs associated with the packets. For example, data structure 404 may include mark values of packets, and identifiers of UEs associated with such packets (e.g., UEs to which the packets were sent and/or from which the packets were received). While shown in this figure in the format "UE_A" and "UE_B," the UE identifiers may include any suitable identifiers such as International Mobile Station Equipment Identity ("IMEI") values, International Mobile Subscriber Identity ("MR") values, and/or other suitable identifiers. NPC-A 301 may identify the UE identifiers based on header information of the packets or other suitable information.

In some embodiments, NPC-A 301 may receive SLA information (e.g., from SLA repository 107) that indicates particular SLAs associated with particular UEs. In some embodiments, such information may be used in generating data structure 402 (e.g., identifying a particular SLA associated with a particular packet), and/or to generate other information as discussed below.

As shown in FIG. 4C, data structure 406 may indicate per-SLA performance metrics associated with traffic sent between network components 101. As shown, for instance, traffic associated with the "Under 10 ms" SLA may exhibit a 9 ms uplink ("UL") delay, which may be based on one-way delay metrics over time of traffic sent from a UE to a first network component 101 via a second network component 101. Referring to the example of FIG. 3, the UL delay may be based on evaluating one-way delay of traffic sent from gNB 203 to MEC 201 over a particular time period. The value reflected in data structure 406 (i.e., 9 ms in this example) may be based on an average one-way delay over the particular time period, a median one-way delay over the particular time period, a minimum one-way delay over the particular time period, a maximum one-way delay over the particular time period, or some other value that reflects or is derived from one-way delay values over the particular time period. Similarly, the "DL delay" value may be based on one-way delay values for traffic from the second network component 101 toward the UE via the first network component 101 (e.g., from MEC 201 to gNB 203, referring to the example shown in FIG. 3).

The round-trip ("RT") delay values for traffic associated with a particular SLA may, in some embodiments, be based on the UL delay values and the DL delay values for such traffic. For example, in some embodiments, the RT delay values may be based on adding the UL delay values to the DL delay values, and/or may be based on other types of operations.

The jitter values for traffic associated with a particular SLA may, in some embodiments, be based on differences between individual one-way delay times of such traffic. In some embodiments, jitter may be separately reflected in terms of UL jitter and DL jitter, or may be reflected as a combined value that is based on UL jitter and DL jitter.

The packet loss values for traffic associated with a particular SLA may, in some embodiments, be based on a proportion of marked packets that were not received by their intended destination. For example, a packet may be considered as "lost" if NPC-M 103 marks a packet and a corresponding NPC-D 105 (e.g., NPC-D 105 associated with network component 101 to which the packet is destined) does not indicate that the packet is received within a threshold amount of time (e.g., one second, ten seconds, or some other threshold).

In some embodiments, one instance of data structure 406 may be maintained for each pair of network components 101. Thus, referring to the example of FIG. 3, NPC-A 301 may maintain one instance of data structure 406 for traffic sent between MEC 201 and gNB 203. Further, while data structure 406 is described in the context of maintaining performance information for traffic on a per-SLA basis, such information may be maintained or presented on another basis, such as on a per-UE basis or some other basis.

As discussed above, performance metrics of traffic sent between network components 101 may be utilized in combination with RAN performance metrics, to determine overall performance metrics between a particular network component and a UE connected to a RAN. The examples illustrated in FIGS. 5A-5C continues the example information reflected in FIGS. 4A-4C.

For example, as shown in FIG. 5A, data structure 502 may reflect RAN performance information associated with a RAN via which one or more UEs are connected (UE_A and UE_B in this example). The RAN performance information may be granularly presented based on differing QCI values associated with the RAN. While QCI values are discussed in the context of this example, in practice, other differentiating parameters for QoS, SLA, TAI, etc. may be used.

In this example, data structure 502 may reflect that the UL delay for traffic according to QCI 1 for UE_A is 95 ms. For example, the average, median, etc. one-way delay for traffic sent to the RAN from the UE may be 95 ms. Further, the DL delay for traffic according to QCI 1 for UE_A is indicated in data structure 502 as 92 ms, indicating that the average, median, etc. one-way delay for traffic sent to the UE from the RAN is 92 ms. The RT delay for traffic associated with this UE and QCI may be indicated as 182 ms. For example, the RT delay value may be calculated in a manner different from adding the UL delay value to the DL delay value (e.g., the RAN may perform different testing methodologies for testing RT delay than UL and/or DL delay). As further shown, data structure 502 may include jitter and packet loss values on a per-QCI and per-UE basis. As noted above, jitter and/or packet loss may, in some embodiments, be separately reflected as UL and DL values. Data structure 502 may, in some embodiments, be received by NPC-A 301 from one or more elements of a RAN, such as from gNB 203 (as shown in the example of FIG. 3).

As shown in FIG. 5B, data structure 504 may include mappings of different parameters to SLAs. For example, data structure 504 may relate RAN QCI values to SLAs associated with network components 101 or pairs of network components 101 (e.g., SLAs associated with MEC 201 and/or gNB 203). In this example, data structure 504 may indicate that QCI 1 is associated with the "Under 30 ms" SLA, and that QCI 3 is associated with the "Under 10 ms" SLA. In some embodiments, data structure 504 may include different mappings, or a different granularity of mappings. For example, in some embodiments, the same QCI may be associated with different SLAs, depending on which UE the traffic is associated. As another example, different network slices or TAIs may be associated with different SLAs.

As shown in FIG. 5C, NPC-A 301 may generate or maintain aggregated performance information based on RAN metrics (e.g., as reflected in data structure 502) and determined performance metrics between network components 101 (e.g., as reflected in data structure 406). For example, NPC-A 301 may use the mapping information provided in data structure 504 to determine which RAN metrics (e.g., as indicated in data structure 502) correspond to which network component 101 metrics (e.g., as indicated in data structure 406). As an example, NPC-A 301 may aggregate, combine, etc. the UL delay values reflected in data structure 406 to the UL delay values reflected in data structure 502 to determine an overall UL delay values associated with a particular SLA/QCI combination for a particular UE. Continuing the example of FIG. 3, the UL delay value for traffic associated with the QCI 3/Under 10 ms QCI/SLA pair for UE_A may be 51 ms, which may reflect an average, median, etc. one-way delay of traffic sent from UE_A via a RAN associated with gNB 203 to MEC 201. Similarly, the DL delay, RT delay, jitter, and packet loss values reflected in data structure 506 may be based on performance metrics associated with this traffic path (e.g., between MEC 201 and a UE connected to a RAN implemented by gNB 203).

Figure 6:
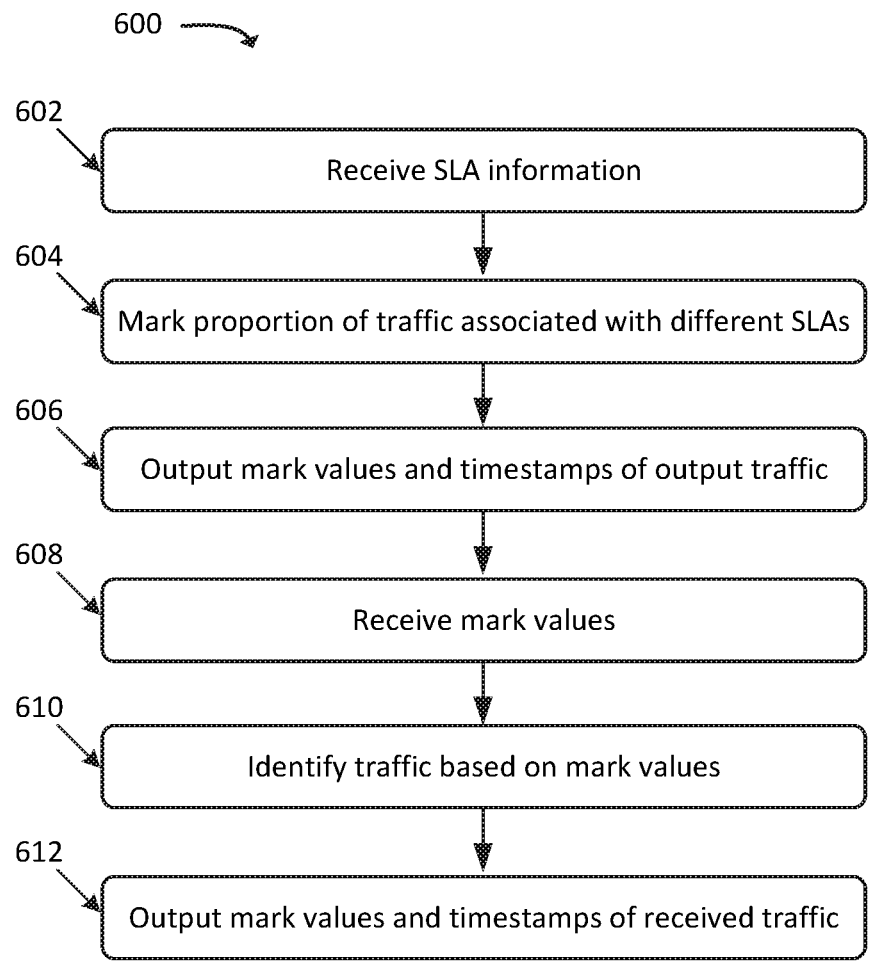
FIG. 6 illustrates an example process for marking traffic associated with particular SLAs and identifying performance metrics based on marked traffic, in accordance with some embodiments.

FIG. 6 illustrates an example process 600 for marking traffic associated with particular SLAs and identifying performance metrics based on marked traffic. In some embodiments, some or all of process 600 may be performed by a NPC (e.g., NPC-M 103 and NPC-D 105). In some embodiments, one or more other devices may perform some or all of process 600 in concert with, and/or in lieu of, NPC-M 103 and/or NPC-D 105.

As shown, process 600 may include receiving (at 602) SLA information. For example, NPC-M 103 may receive (e.g., from SLA repository 107 or some other source) information regarding one or more SLAs. As noted above, NPC-M 103 may be associated with a particular network component 101, which may be associated with a set of SLAs. Additionally, or alternatively, NPC-M 103 may receive SLA information for one or more users, UEs, network slices, TAIs, and/or other granular SLA information. The SLA information may indicate threshold performance values, such as latency, jitter, packet loss, and/or other values for other performance metrics.

Process 600 may further include marking (at 604) a proportion of traffic associated with the indicated SLAs. For example, NPC-M 103 may identify egress traffic (e.g., traffic that is output by, is queued to be output by, and/or is otherwise destined to be transmitted to another network component 101) associated with network component 101. As discussed above, NPC-M 103 may mark a portion of traffic associated with one or more different SLAs. In some embodiments, NPC-M 103 may mark all traffic associated with one or more SLAs. In some embodiments, NPC-M 103 may mark different portions of traffic associated with different SLAs. In some embodiments, NPC-M 103 may receive an instruction (e.g., from NPC-A 301 or some other source) to modify a portion of traffic based on one or more trigger events detected by NPC-A 301. For example, NPC-A 301 and/or NPC-M 103 may determine that a particular SLA is not met, and NPC-M 103 may accordingly increase an amount of traffic associated with the particular SLA that is marked. In this manner, traffic associated with this particular SLA may be able to be evaluated more closely to verify whether the SLA is being met or not.

As discussed above, marking (at 604) the traffic may include adding mark values to header information (e.g., shim headers, MPLS labels, etc.). In some embodiments, the mark values may include an index or other identifier associated with the particular SLA with which the traffic is associated.

Process 600 may additionally include outputting (at 606) mark values and timestamps of output traffic. For example, NPC-M 103 may output the mark values to NPC-A 301, NPC-D 105 (e.g., where NPC-D 105 is associated with a particular network component 101 to which the traffic is destined), and/or to some other device or system. Further NPC-M 103 may output timestamps corresponding to a time at which the traffic was output by NPC-M 103 (and/or by a particular network component 101 with which NPC-M 103 is associated). As discussed above, the timestamps may be encoded or otherwise included in the mark values.

Process 600 may also include receiving (at 608) the mark values. For example, NPC-D 105 may receive the mark values from NPC-M 103, NPC-A 301, and/or some other device or system.

Process 600 may further include identifying (at 610) traffic based on the mark values. For example, NPC-D 105 (e.g., a particular network component 101 with which NPC-D 105 is associated) may receive traffic with the mark values (received at 608). NPC-D 105 may identify traffic having the mark values, and may determine a time at which the traffic is received.

Process 600 may additionally include outputting (at 612) the mark values and timestamps of received traffic. For example, NPC-D 105 may output (e.g., to NPC-A 301) information indicating which packets were received at which time. Based on this information, as discussed above, NPC-A 301 may determine one-way delay values of marked traffic, and/or may determine additional performance metrics on a per-SLA basis or some other granular basis.

Figure 7:
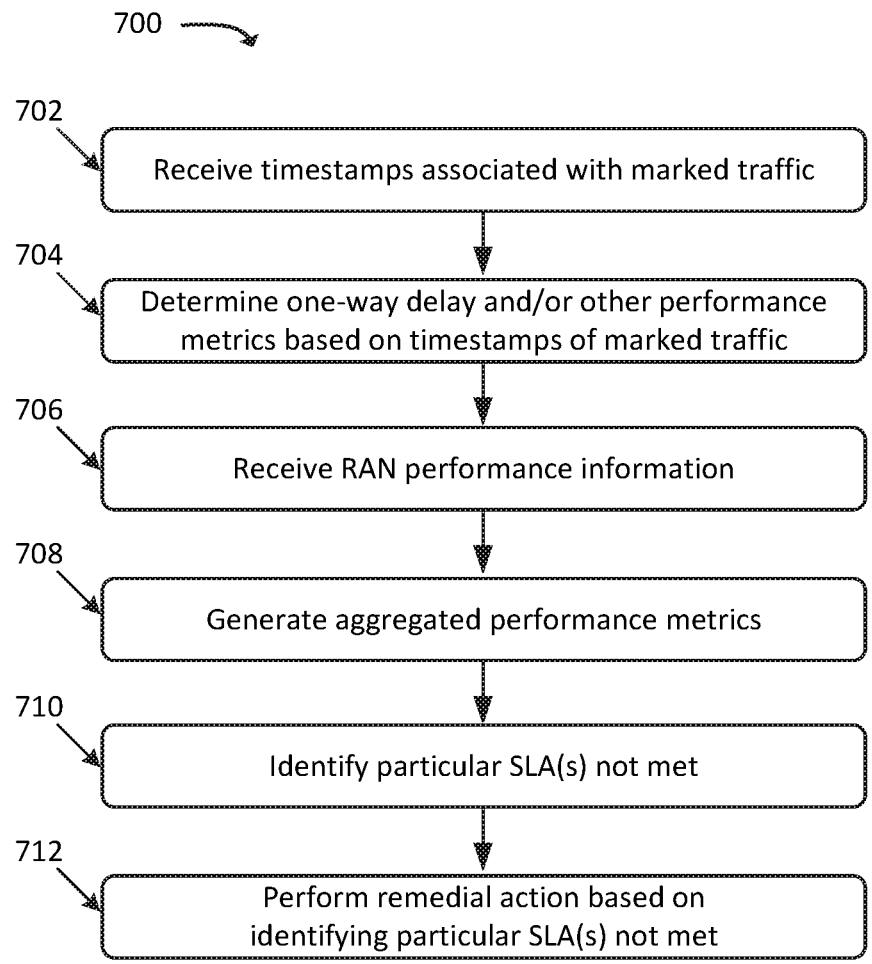
FIG. 7 illustrates an example process for generating aggregated performance metrics based on marked traffic, in accordance with some embodiments.

FIG. 7 illustrates an example process 700 for generating aggregated performance metrics. In some embodiments, some or all of process 700 may be performed by NPC-A 301. In some embodiments, one or more other devices may perform some or all of process 700 in concert with, and/or in lieu of, NPC-A 301.

As shown, process 700 may include receiving (at 702) timestamps associated with marked traffic. For example, NPC-A 301 may receive (e.g., from NPC-M 103 and NPC-D 105) timestamps indicating times at which particular traffic (e.g., marked traffic) was output by a network component 101 associated with NPC-M 103 and was received by another network component 101 associated with NPC-D 105.

Process 700 may further include determining (at 704) one-way delay and/or other performance metrics based on the timestamps of the marked traffic. For example, as discussed above, NPC-A 301 may determine amounts of time that traffic took to reach NPC-D 105 from NPC-M 103, and may further calculate aggregated metrics such as jitter, packet loss, or the like.

Process 700 may additionally include receiving (at 706) RAN performance information. For example, NPC-A 301 may receive (e.g., from a base station of a wireless network, such as a gNB, an evolved Node B ("eNB"), or some other type of base station) performance metrics associated with traffic carried by the RAN. The RAN performance information may include identifiers of particular UEs with which the RAN traffic is associated, network slices with which the RAN traffic is associated, TAIs with which the RAN traffic is associated, QCI values associated with the RAN traffic, and/or other parameters.

Process 700 may also include generating (at 708) aggregated performance metrics. For example, as discussed above, NPC-A 301 may determine performance metrics based on the RAN performance information as well as the determined (at 704) performance metrics associated with the traffic between NPC-M 103 and NPC-D 105. As noted above, the same network components 101 that implement NPC-M 103 and NPC-D 105, respectively, may also implement instances of NPC-D 105 and NPC-M 103, respectively, in order to facilitate the determination of two-way performance metrics associated with such network components.

Process 700 may further include identifying (at 710) that one or more SLAs are not met. For example, based on the performance metrics (e.g., determined at 704 and/or 710), NPC-A 301 may determine that parameters of one or more performance metrics (e.g., latency, jitter, packet loss, etc.) are not met.

Process 700 may additionally include performing (at 712) remedial one or more actions based on identifying that the one or more SLAs are not met. For example, NPC-A 301 may generate an alert indicating that the one or more SLAs are not met, may request or provision additional resources at a particular network component 101 that implements NPC-M 103 and/or NPC-D 105, may instruct network component 101 to reduce a bitrate of traffic output from network component 101, may instruct NPC-M 103 to mark a higher proportion of packets, and/or may perform other suitable remedial measures. In some embodiments, NPC-A 301 may utilize machine learning and/or other suitable techniques to determine an appropriate remedial action to take, based on the SLAs that were not met and/or other characteristics of the traffic (e.g., by how wide of a margin the SLAs were not met, a particular UE or network component 101 with which the traffic is associated, an application type associated with the traffic, and/or other characteristics).

For example, in an example where the traffic is voice call traffic that is not meeting a minimum DL delay SLA from MEC 201 to gNB 203, NPC-A 301 may determine that the appropriate remedial measure to take is to instruct MEC 201 to allocate additional resources (e.g., processor resources, memory resources, etc.) to voice call traffic, increase a queue weight associated with voice call traffic, and/or otherwise take measures to reduce the DL delay of voice call traffic from MEC 201 to gNB 203. As another example, if NPC-A 301 determines that traffic between two components of an O-RAN architecture are not meeting one or more SLAs, NPC-A 301 may output an alert or instruction to one or more controllers associated with the O-RAN indicating that the traffic between these two particular components is not meeting the one or more SLAs. Additionally, or alternatively, NPC-A 301 may provide performance metrics (e.g., as determined at 704 and/or 708) to one or more controllers associated with the O-RAN, based on which the one or more controllers may make modifications to the O-RAN in situations where one or more SLAs are not met.

Figure 8:
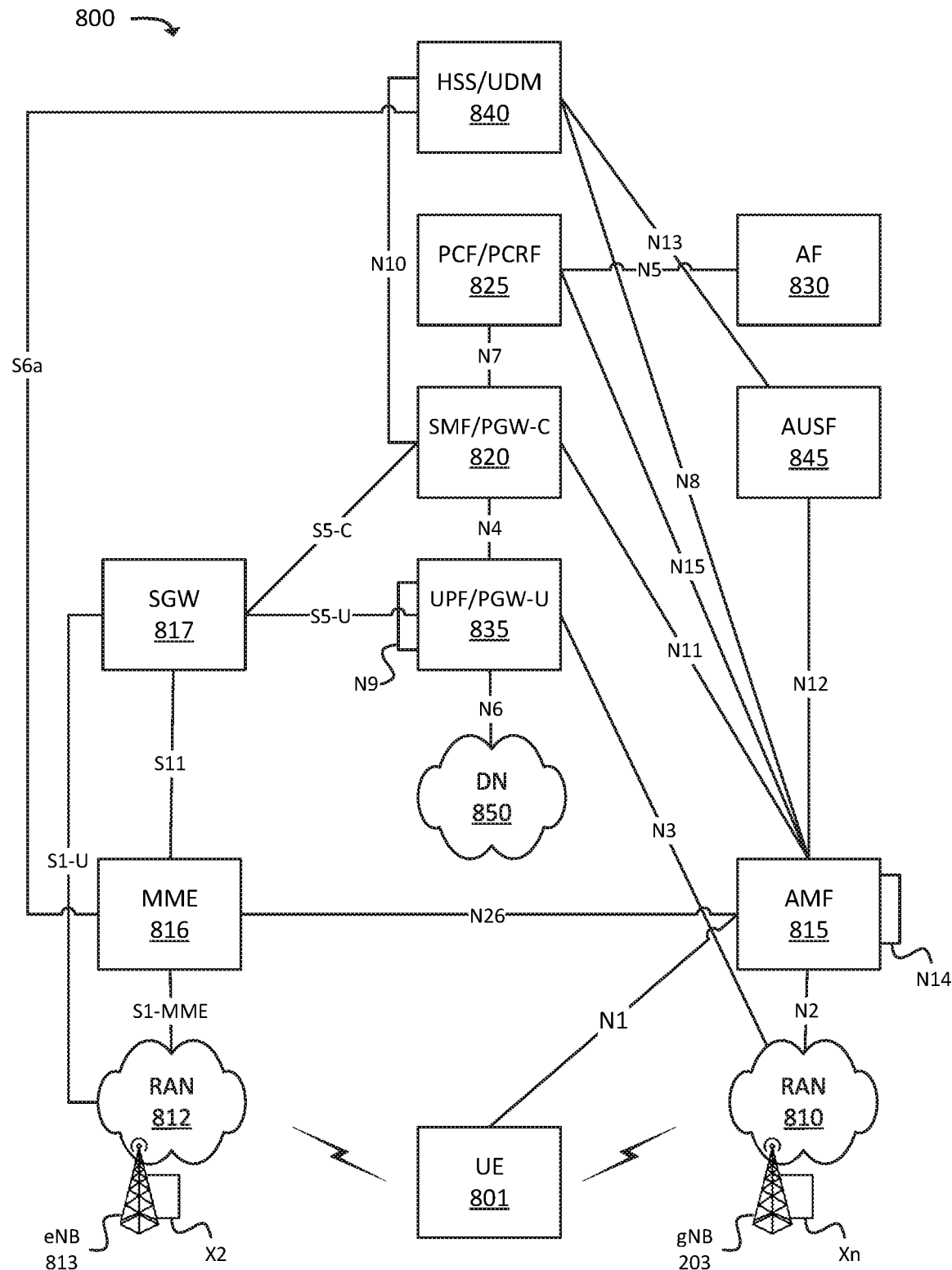
FIG. 8 illustrates an example environment in which one or more embodiments, described herein, may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 800 may include UE 801, RAN 810 (which may include one or more gNBs 203), RAN 812 (which may include one or more one or more evolved eNBs 813), and various network functions such as Access and Mobility Management Function ("AMF") 815, Mobility Management Entity ("MME") 816, Serving Gateway ("SGW") 817, Session Management Function ("SMF")/Packet Data Network ("PDN") Gateway ("PGW")-Control plane function ("PGW-C") 820, PCF/PCRF 825, Application Function ("AF") 830, User Plane Function ("UPF")/PGW-User plane function ("PGW-U") 835, HSS/UDM 840, and Authentication Server Function ("AUSF") 845. Environment 800 may also include one or more networks, such as Data Network ("DN") 850.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 810, RAN 812, and/or DN 850. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 801 may send traffic to and/or receive traffic (e.g., user plane traffic) from DN 850 via RAN 810, RAN 812, and/or UPF/PGW-U 835.

RAN 810 may be, or may include, a 5G RAN that includes one or more base stations (e.g., one or more gNBs 203), via which UE 801 may communicate with one or more other elements of environment 800. UE 801 may communicate with RAN 810 via an air interface (e.g., as provided by gNB 203). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, AMF 815, and/or one or more other devices or networks) and may communicate the traffic to UE 801 via the air interface.

RAN 812 may be, or may include, a LTE RAN that includes one or more base stations (e.g., one or more eNBs 813), via which UE 801 may communicate with one or more other elements of environment 800. UE 801 may communicate with RAN 812 via an air interface (e.g., as provided by eNB 813). For instance, RAN 810 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 810 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 810 and/or gNBs 203, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 810 and 812).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 850, and may forward the user plane data toward UE 801 (e.g., via RAN 810, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 810, SMF/PGW-C 820, and/or one or more other devices), and may forward the traffic toward DN 850. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 850 may include one or more wired and/or wireless networks. For example, DN 850 may include an Internet Protocol ("IP")-based PDN, a wide area network ("WAN") such as the Internet, a private enterprise network, and/or one or more other networks. UE 801 may communicate, through DN 850, with data servers, other UEs 801, and/or to other servers or applications that are coupled to DN 850. DN 850 may be connected to one or more other networks, such as a public switched telephone network ("PSTN"), a public land mobile network ("PLMN"), and/or another network. DN 850 may be connected to one or more devices, such as content providers, applications, web servers, and/or other devices, with which UE 801 may communicate.

Figure 9:
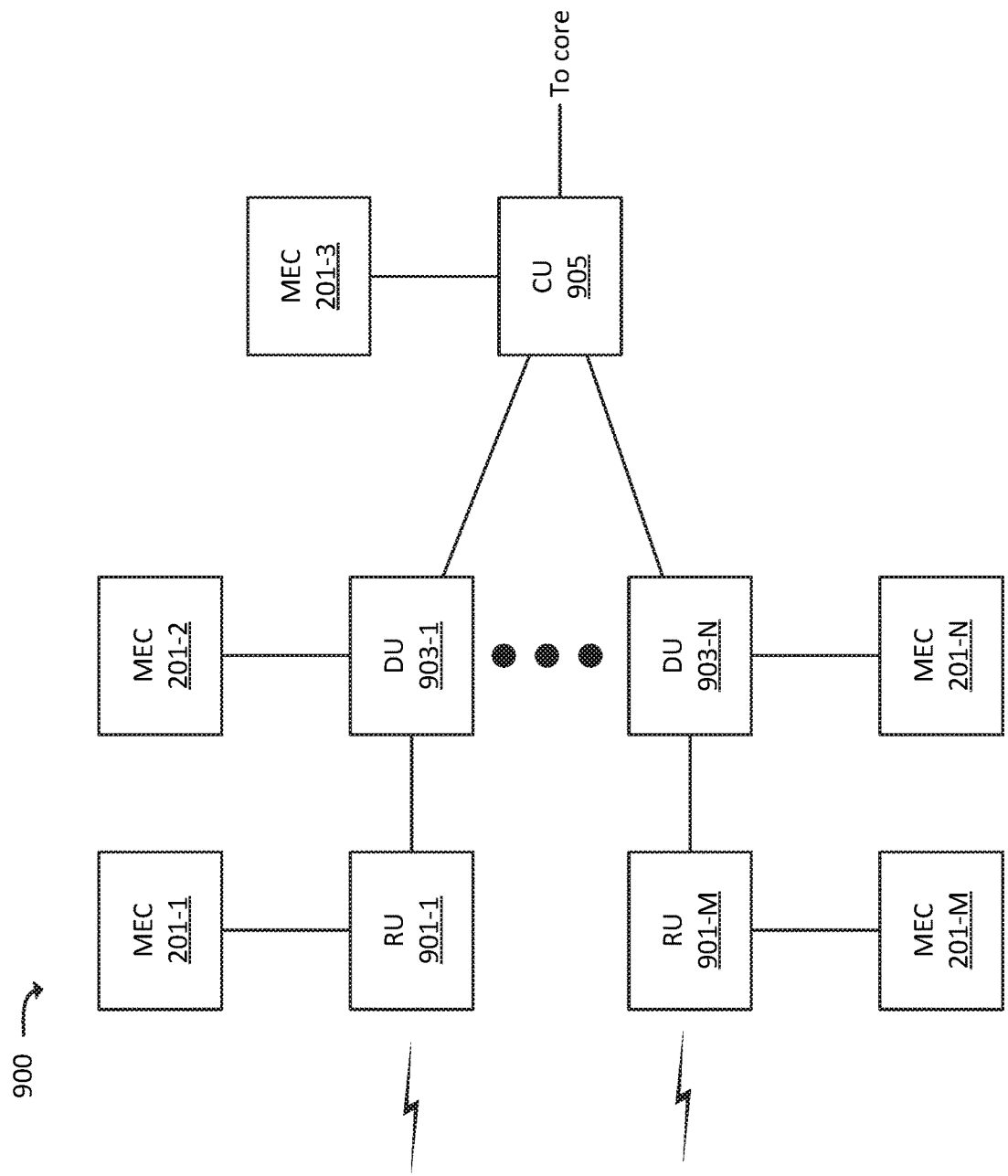
FIG. 9 illustrates an example arrangement of a radio access network ("RAN"), in accordance with some embodiments.

FIG. 9 illustrates an example Distributed Unit ("DU") network 900, which may be included in and/or implemented by one or more RANs (e.g., RAN 810). In some embodiments, a particular RAN may include one DU network 900. In some embodiments, a particular RAN may include multiple DU networks 900. In some embodiments, DU network 900 may correspond to a particular gNB 203 of a 5G RAN (e.g., RAN 810). In some embodiments, DU network 900 may correspond to multiple gNBs 203. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Remote Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more MECs 201. For example, RU 901-1 may be communicatively coupled to MEC 201-1, RU 901-M may be communicatively coupled to MEC 201-M, DU 903-1 may be communicatively coupled to MEC 201-2, DU 1103-N may be communicatively coupled to MEC 201-N, CU 1105 may be communicatively coupled to MEC 201-3, and so on. MECs 201 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 201-1 instead of to a core network (e.g., via DU 903 and CU 905). MEC 201-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network.

Figure 10:
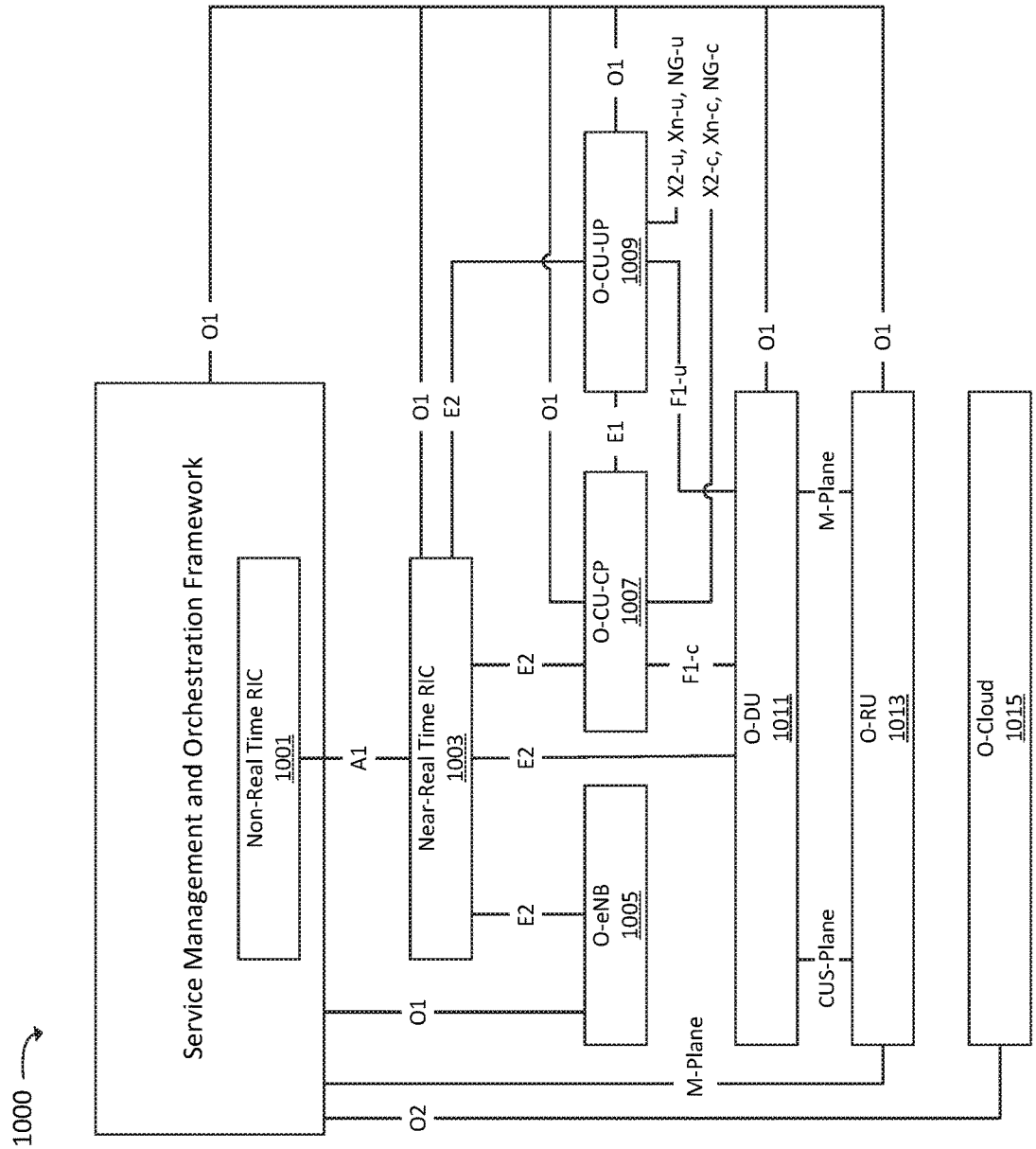
FIG. 10 illustrates an example arrangement of an Open RAN ("O-RAN") environment, in accordance with some embodiments.

FIG. 10 illustrates an example O-RAN environment 1000, which may correspond to RAN 810, RAN 812, and/or DU network 900. For example, RAN 810, RAN 812, and/or DU network 900 may include one or more instances of O-RAN environment 1000, and/or one or more instances of O-RAN environment 1000 may implement RAN 810, RAN 812, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-eNB 1005, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 201.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time MC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between 801 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 201, which may provide services, and may be communicatively coupled, to O-CU-CP 1007, O-CU-UP 1009, O-DU 1011, and/or O-RU 1013 (e.g., via an O1 and/or O2 interface).

In some embodiments, one or more elements of O-RAN environment 1000 may include an instance of NPC-M 103 and/or NPC-D 105, in order to determine performance metrics of traffic sent between elements of O-RAN environment 1000 (e.g., via one or more of the illustrated interfaces, such as the O1 interfaces, O2 interfaces, E1 interfaces, E2 interfaces, F1-c interfaces, F1-u interfaces, etc.). In some embodiments, Non-Real Time RIC 1001, Near-Real Time RIC 1003, network component 1015, and/or one or more other elements of O-RAN environment 1000 may include and/or may implement NPC-A 301, in order to determine aggregated performance metrics and modify parameters of elements of O-RAN environment 1000 based on such aggregated performance metrics.

Figure 11:
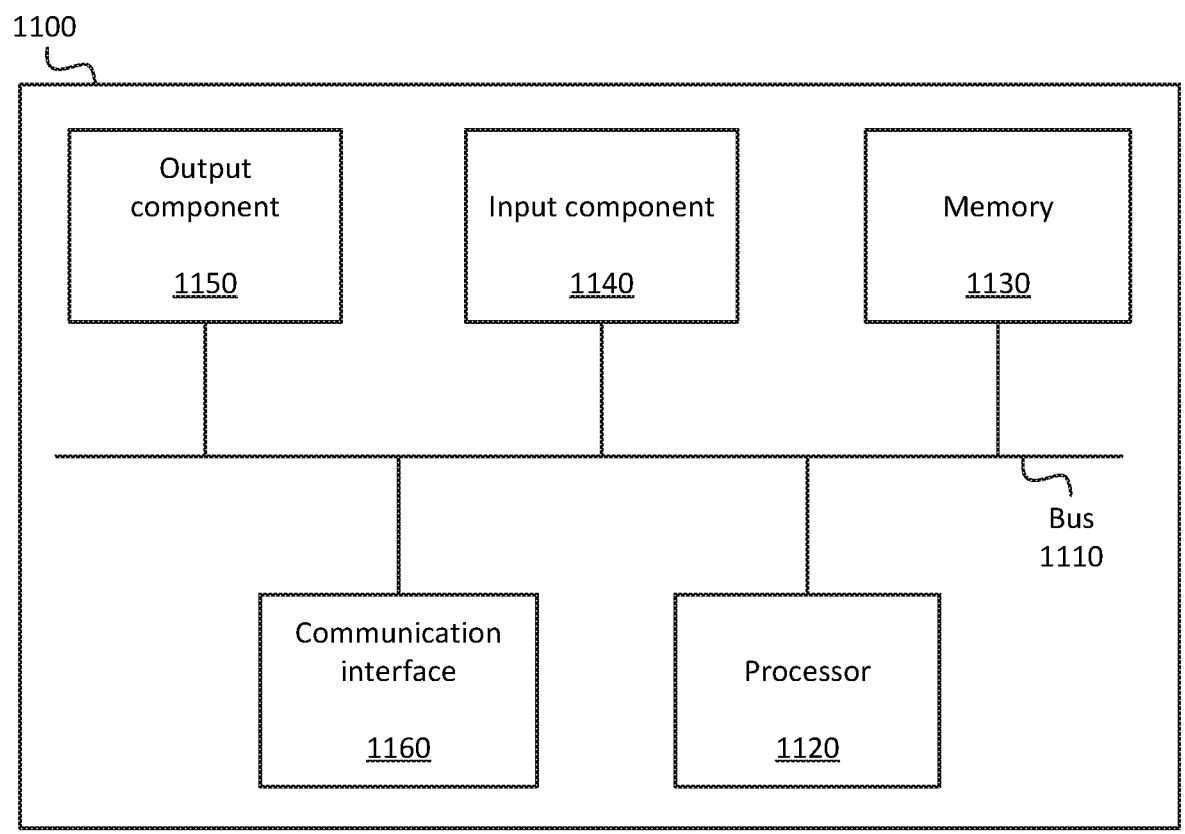
FIG. 11 illustrates example functional components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-3, 6, and 7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      identify a set of traffic associated with a particular Service Level Agreement ("SLA"), the set of traffic being destined for a particular network component;
      add encrypted mark values to the set of traffic, wherein the encrypted mark values are associated with the particular SLA;
      output the set of traffic, including the encrypted mark values, to the particular network component, wherein the particular network component:
         decrypts the encrypted mark values; and
         outputs, to an aggregator, based on decrypting the encrypted mark values, a second set of times at which the traffic was received by the particular network component;
      determine a first set of times at which the traffic that includes the encrypted mark values was output to the particular network component; and
      output, to an aggregator, the encrypted mark values and the first set of times at which the traffic was output to the particular network component, wherein the aggregator further determines, based on the received encrypted mark values, the first set of times, and the second set of times, whether the particular SLA was met by the traffic.

2. The device of claim 1, wherein the aggregator further performs a remedial action with respect to the particular SLA when determining that the particular SLA was not met by the traffic.

3. The device of claim 2, wherein the remedial action includes outputting an alert indicating that the particular SLA was not met.

4. The device of claim 1, wherein the encrypted mark values include an encrypted indicator of the particular SLA, wherein the particular network component identifies the particular SLA based on the encrypted indicator when decrypting the encrypted mark values.

5. The device of claim 1, wherein the one or more processors are further configured to:
   output, to the aggregator, an indication of one or more times at which the traffic was output to the particular network component,
   wherein the aggregator determines the first set of times based on the one or more times at which the traffic was output to the particular network component.

6. The device of claim 1, wherein adding the encrypted mark values to the set of traffic includes adding the encrypted mark values to header information associated with the set of traffic.

7. The device of claim 6, wherein identifying the set of traffic associated with the particular SLA includes identifying a particular proportion of traffic, associated with the particular SLA, that is output to the particular network component,
   wherein the particular proportion is less than all traffic associated with the particular SLA that is output to the particular network component,
   wherein adding the mark values to the set of traffic includes adding the mark values to the header information of the particular proportion of traffic associated with the particular SLA without adding the mark values to header information of all traffic associated with the particular SLA.

8. A non-transitory computer-readable medium, storing a plurality of processor-executable instructions to:
- identify a set of traffic associated with a particular Service Level Agreement ("SLA"), the set of traffic being destined for a particular network component;
- add encrypted mark values to the set of traffic, wherein the encrypted mark values are associated with the particular SLA;
- output the set of traffic, including the encrypted mark values, to the particular network component, wherein the particular network component:
  - decrypts the encrypted mark values; and
  - outputs, to an aggregator, based on decrypting the encrypted mark values, a second set of times at which the traffic was received by the particular network component;
- determine a first set of times at which the traffic that includes the encrypted mark values was output to the particular network component; and
- output, to an aggregator, the encrypted mark values and the first set of times at which the traffic was output to the particular network component, wherein the aggregator further determines, based on the received encrypted mark values, the first set of times, and the second set of times, whether the particular SLA was met by the traffic.

9. The non-transitory computer-readable medium of claim 8, wherein the aggregator further performs a remedial action with respect to the particular SLA when determining that the particular SLA was not met by the traffic.

10. The non-transitory computer-readable medium of claim 9, wherein the remedial action includes outputting an alert to a device that output the set of traffic to the particular network component.

11. The non-transitory computer-readable medium of claim 8, wherein the encrypted mark values include an encrypted indicator of the particular SLA, wherein the particular network component identifies the particular SLA based on the encrypted indicator when decrypting the encrypted mark values.

12. The non-transitory computer-readable medium of claim 8, wherein the plurality of processor-executable instructions further include processor-executable instructions to:
- output, to the aggregator, an indication of one or more times at which the traffic was output to the particular network component,
- wherein the aggregator determines the first set of times based on the one or more times at which the traffic was output to the particular network component.

13. The non-transitory computer-readable medium of claim 8, wherein adding the encrypted mark values to the set of traffic includes adding the encrypted mark values to header information associated with the set of traffic.

14. The non-transitory computer-readable medium of claim 13, wherein identifying the set of traffic associated with the particular SLA includes identifying a particular proportion of traffic, associated with the particular SLA, that is output to the particular network component,
- wherein the particular proportion is less than all traffic associated with the particular SLA that is output to the particular network component,
- wherein adding the mark values to the set of traffic includes adding the mark values to the header information of the particular proportion of traffic associated with the particular SLA without adding the mark values to header information of all traffic associated with the particular SLA.

15. A method, comprising:
- identifying a set of traffic associated with a particular Service Level Agreement ("SLA"), the set of traffic being destined for a particular network component;
- adding encrypted mark values to the set of traffic, wherein the encrypted mark values are associated with the particular SLA;
- outputting the set of traffic, including the encrypted mark values, to the particular network component, wherein the particular network component:
  - decrypts the encrypted mark values; and
  - outputs, to an aggregator, based on decrypting the encrypted mark values, a second set of times at which the traffic was received by the particular network component;
- determining a first set of times at which the traffic that includes the encrypted mark values was output to the particular network component; and
- outputting, to an aggregator, the encrypted mark values and the first set of times at which the traffic was output to the particular network component, wherein the aggregator determines, based on the received encrypted mark values, the first set of times, and the second set of times, whether the particular SLA was met by the traffic.

16. The method of claim 15, wherein the aggregator further outputs an alert when determining that the particular SLA was not met by the traffic.

17. The method of claim 15, wherein the encrypted mark values include an encrypted indicator of the particular SLA, wherein the particular network component identifies the particular SLA based on the encrypted indicator when decrypting the encrypted mark values.

18. The method of claim 15, further comprising:
- outputting, to the aggregator, an indication of one or more times at which the traffic was output to the particular network component,
- wherein the aggregator determines the first set of times based on the one or more times at which the traffic was output to the particular network component.

19. The method of claim 15, wherein adding the mark values to the set of traffic includes adding the encrypted mark values to header information associated with the set of traffic.

20. The method of claim 19, wherein identifying the set of traffic associated with the particular SLA includes identifying a particular proportion of traffic, associated with the particular SLA, that is output to the particular network component,
- wherein the particular proportion is less than all traffic associated with the particular SLA that is output to the particular network component,
- wherein adding the mark values to the set of traffic includes adding the mark values to the header information of the particular proportion of traffic associated with the particular SLA without adding the mark values to header information of all traffic associated with the particular SLA.

* * * * *